Jan. 8, 1946.　　　　　H. K. FOSTER　　　　　2,392,656
FILTER PLUG
Filed May 28, 1942
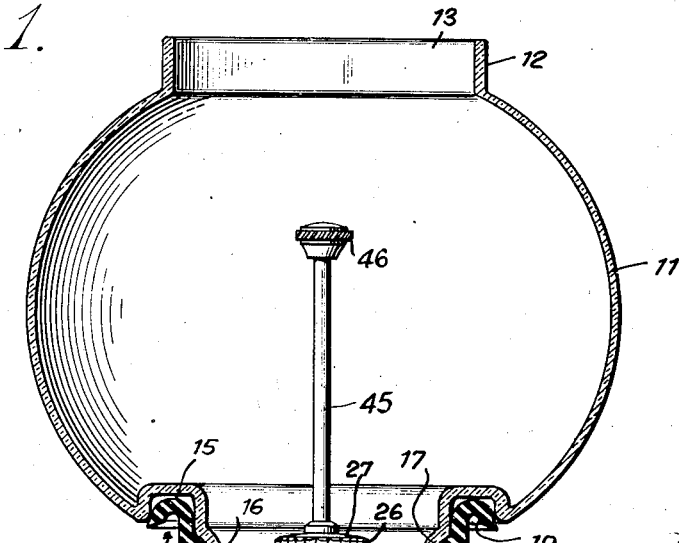
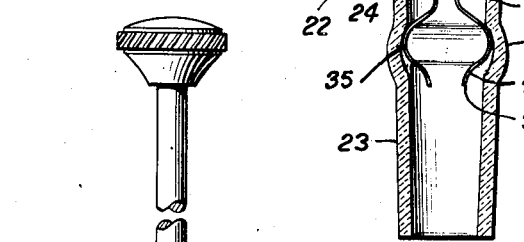
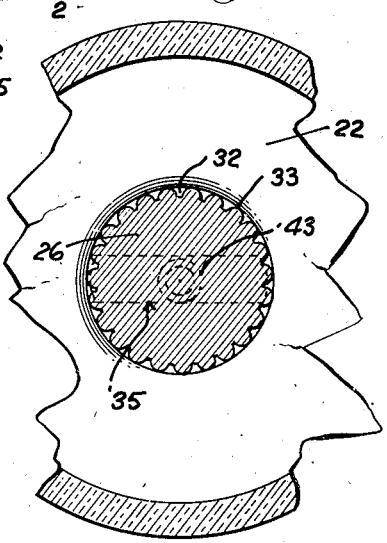
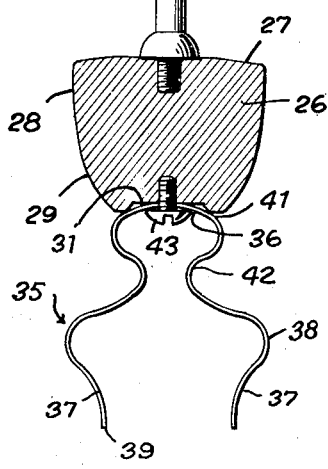
INVENTOR.
Hoyt K. Foster
BY Patented Jan. 8, 1946

2,392,656

UNITED STATES PATENT OFFICE 2,392,656

FILTER PLUG

Hoyt K. Foster, Hollis, N. Y., assignor to S. W. Farber, Inc., Brooklyn, N. Y.

Application May 28, 1942, Serial No. 444,873

4 Claims. (Cl. 99—292)

My present invention relates to filter plugs for use with vacuum type coffee brewers.

In such brewers the ground coffee bean is placed in an upper container and water is placed in a lower container. Heating the water generates sufficient pressure to force the water from the lower into the upper container with the ground coffee. Upon removal of the heat, condensation occurs in the lower container, and by reason of the vacuum produced therein the brewed coffee infusion returns to the lower container, from which it is served.

A filter is located between the upper and lower containers, which filter permits the heated water to pass into the upper container and permits the coffee infusion to pass into the lower container but retains the coffee grounds in the upper container.

Various constructions of filters have been proposed in the past ranging through cloth and wire screens, springs, stacked multiple discs, glass balls with roughened surfaces, and other forms. Various arrangements have also been provided for keeping the filter in place, at least when the coffee infusion is passing from the upper to the lower container, so that the coffee grounds are kept out of the lower container.

The present invention is an improvement over the filter devices of the prior art both from the standpoint of advantage to the public using this type of coffee maker and from the standpoint of the manufacturer thereof.

The new filter is simple and inexpensive to manufacture, being constructed of only a few parts that are easily fabricated and assembled. Its structure is such that it is universally useable notwithstanding variations in sizes of the opening from the upper container, with which the filter is used. The filter will have a long life giving satisfactory service to the public, and there are no elements requiring periodic renewal.

The filter is provided with a spring arrangement which cooperates with a portion of the upper container to automatically and properly seat the filter in position, and also to retain the filter on its seat at all times during the operation of the apparatus.

The filter plug is constructed to be self-seating and sealing, with passages therethrough evenly distributed about the plug to facilitate substantially simultaneous and equal filtering from all directions. Furthermore, the proportioning of the passages in the plug is such that they are sufficient for the upward passage of the water under pressure, yet small enough to restrain the passage of the coffee grounds into the lower container with the coffee infusion.

The foregoing and other objects and advantages of my improved construction will be apparent from this specification taken with the accompanying drawing, in which—

Figure 1 is an elevation of an upper container of a vacuum type coffee brewing apparatus with my new filter plug in place, parts being broken away to facilitate illustration.

Fig. 2 is an enlarged fragmentary detail in cross section on the line 2—2 of Fig. 1.

Fig. 3 is an enlarged elevation of the new filter plug, parts being shown in section.

Referring to the drawing, the upper container comprises a bowl 11 having a collar 12 at its top surrounding an opening 13. The lower part of the bowl has a well 14 of redued size which is joined to the bowl by a re-entrant portion 15. The side wall of the well 14 has an inwardly extending groove 16 therein. A rubber sealing ring 17 fits about the sides of the well, the ring having an internal bead 18 of a size to fit in the groove 16 and a folded over flange 19 of a size to fit in the re-entrant portion 15 but leaving an annular slot 21 for the reception in air tight sealing relationship of the throat of the lower container, not shown, but well understood in this field.

The bottom 22 of the well is flat and has depending from the center thereof a slightly tapered tube 23, the tube and bottom being joined by a rounded edge 24. Part way along its length the tube is enlarged to form an internal groove 25.

The filter plug 26, desirably of molded plastic or ceramic material, is somewhat conoidal in shape and used inverted with its broad surface 27 uppermost, the slightly tapered sides 28 culminating in the rounded or arcuate portion 29. The tip of the conoid is removed and in this case is recessed as indicated at 31. At each end the plug 26 is centrally tapped to receive screw threaded members as will be pointed out.

The outer surface of the filter 26 has a series of equally spaced vertically extending channels 32 between which are the rounded ridges 33, the channels having an appreciable width at the base and a depth slightly less than half the base width of the ridges. In one form of plug in commercial use, the ridges are one-eighth inch in width and the channels have a depth of approximately three-sixty-fourths inch. When the plug is in operating position (Fig. 1) the rounded tops of the ridges 33 engage with either the rounded edge 24, between the well and the tube 23, or the inner side of the tube 23 immedately adjacent the rounded edge 24. This variation in position of the filter occurs because of unavoidable manufacturing variations in the size of the glass tube 23 and the exact location and size of the rounded edge 24. But it will be observed that no matter what these relationships of filter plug 26 and tube 23, etc., may be there will be at all times substantially the same area of openings about the plug providing communication between the upper and lower containers for the passage of fluids.

Attached to the lower end of the filter is a retention and positioning spring 35, which is made of flat stock and appropriately bent to shape. The spring has a flat top portion 36 and two depending legs 37. Each leg has a major outward bow 38 located a short distance above the free end 39 thereof, and a minor outward bow 41 extending from the edge of the flat top 36, the minor and major bows being joined by an inward crimp 42. The spring is held onto the filter 26 by means of a screw 43 engaging in one of the tapped holes of the filter.

The major bows 38 are of a size to fit substantially well into the internal groove 25 of the tube 23 when the filter plug is in place. The span between the major bows when the filter is not in place is greater than the greatest internal diameter of the tube 23, while the maximum span between the free ends 39 is less than the internal diameter of the tube 23. Thus, these free ends provide an entering wedge or guide for the spring, and as the filter is pressed into its operating position the consequent compressing of the spring puts it under considerable extra tension. As the apices of the major bows pass the upper junction of the internal groove 25 and the tube 23, the expansion of the spring into the groove serves to automatically pull the filter plug down into position on its seat. At the same time, the tension of the spring against the groove and especially against the uppermost part thereof, when the container is upright, is sufficient to retain the filter plug on its seat against the upward surge of the water coming up the tube 23 from the lower container.

The flat top 36 of the spring is longer than the diameter of the recess 31. When the screw 43 is tightened pressure is exerted on the center of the top thereby pulling the legs 37 of the spring together in a preliminary, but permanently held, tension.

Extending upwardly from the filter 26 is a stem 45 extending near to the level of the collar 12 of the container and having at its upper end a knob 46. By this means the filter may be readily removed from and inserted into the container through the opening 13 thereof.

In the use of the filter plug when making the coffee infusion, the plug is in the position shown in Fig. 1. The ground coffee bean, in the required amount, is put into the upper container. A large part, if not all this ground coffee occupies the well 14; and in any event as the coffee infusion returns to the lower container, the coffee grounds pack about the filter plug, but they do not clog up the passages in the filter 26, so that the coffee infusion will pass therethrough satisfactorily and substantially free from fine sediment which would settle in the lower container.

Modifications may be made in the arrangement and location of parts within the spirit and scope of my invention, and such modifications are intended to be covered by the appended claims.

I claim:

1. In a vacuum type coffee brewing apparatus, an upper bowl having a depending tube joined thereto, a filter plug arranged for insertion in the end of said tube adjacent such juncture, said plug comprising a tapered member extending part way into said tube, the outer faces of the plug having a plurality of channels therein which extend substantially from top to bottom of said plug, the channels being of uniform depth, and the ridges between channels engaging said tube, and spring means for retaining the filter plug in operative position in said tube.

2. In a vacuum type coffee brewing apparatus, an upper container having a depending tube joined thereto, said tube having an internal groove intermediate its length, a filter plug for partially closing said tube adjacent the juncture of the container and tube, a recess in the bottom of the filter plug, a spring member spanning the recess and having two free depending legs projecting into said tube, means for securing the spring to the plug so as to place the legs under tension, said legs having opposite each other portions bowed outwardly in arcuate shape, said bowed portions being compressed when inserted in position in said tube and being so arranged that as the point of maximum diameter of the arc passes the edge of said groove the bowed portions expand into said groove and the plug is automatically seated in normal operating position and thereafter retained in such position.

3. In a vacuum type coffee brewing apparatus, an upper bowl having a depending tube joined thereto, a filter plug cooperating with the tube, said filter comprising an inwardly tapering member having channels extending from top to bottom and distributed around the outer surface thereof, the member being of a size to project part way into said tube, means for holding the filter seated so as to close the tube except for the openings provided by said channels, and a handle means on said plug.

4. In a vacuum type coffee brewing apparatus, an upper bowl having a depending tube joined thereto, a filter plug seated adjacent one end of the tube and cooperating directly therewith in the filtering action, said plug comprising an inwardly tapering member of a size to project part way into said tube and having closely spaced channels distributed around the outer surface thereof, said channels extending vertically along said plug a substantial distance above and below its seat adjacent the end of the tube, means for resiliently holding the filter plug seated so as to close the tube except for the openings provided by said channels, and a handle means on said plug.

HOYT K. FOSTER.